No. 703,177. Patented June 24, 1902.
H. H. BUFFUM.
COOLER.
(Application filed Sept. 16, 1901.)
(No Model.)
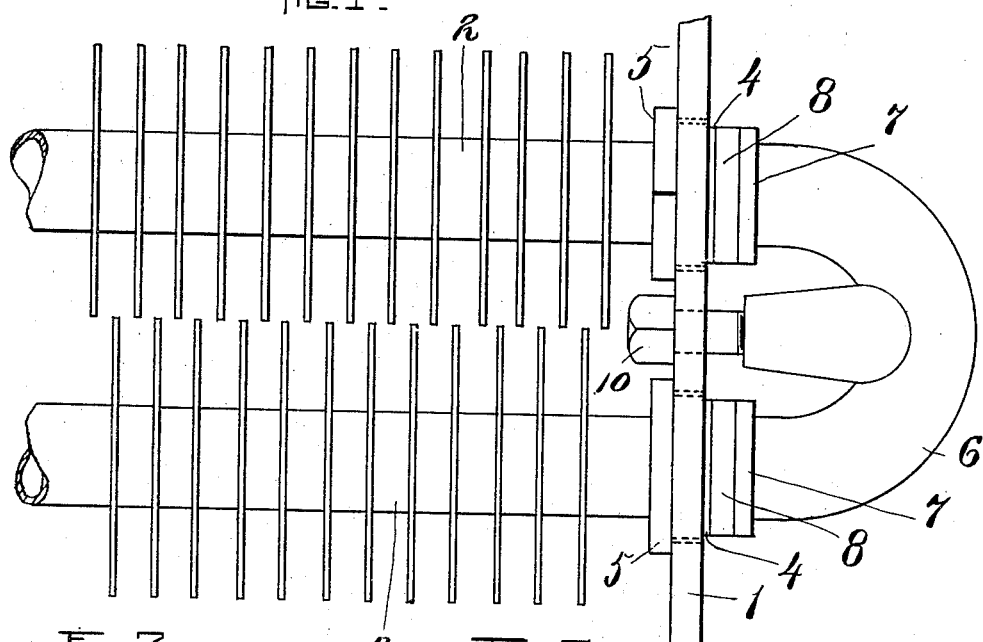
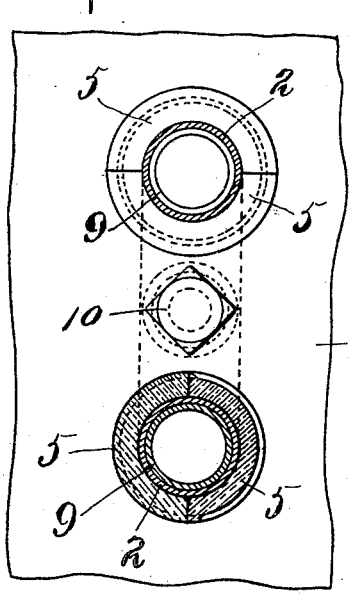
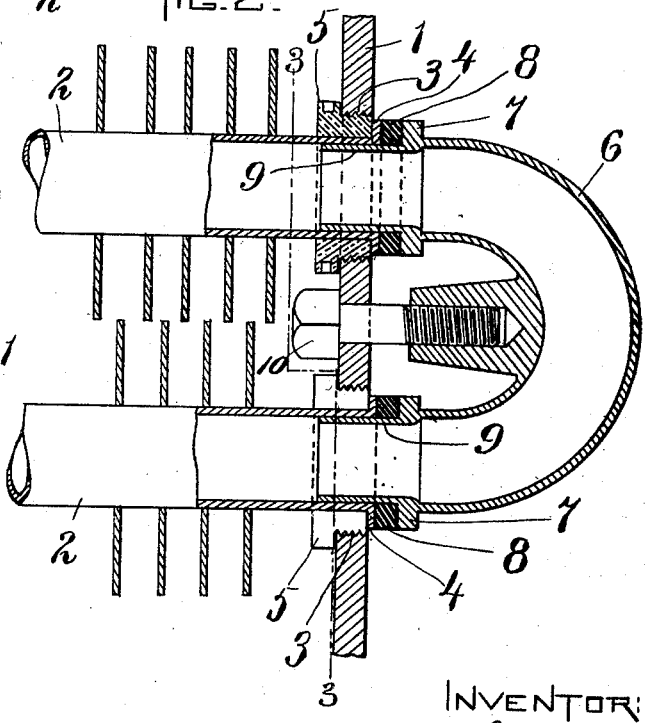
WITNESSES:
INVENTOR:

UNITED STATES PATENT OFFICE.

HERBERT H. BUFFUM, OF ABINGTON, MASSACHUSETTS.

COOLER.

SPECIFICATION forming part of Letters Patent No. 703,177, dated June 24, 1902.

Application filed September 16, 1901. Serial No. 75,505. (No model.)

*To all whom it may concern:*

Be it known that I, HERBERT H. BUFFUM, of Abington, in the county of Plymouth and State of Massachusetts, have invented certain new and useful Improvements in Coolers, of which the following is a specification.

This invention relates to apparatus—such as heaters, coolers, or condensers—for transferring heat from one fluid to another, having a series of pipes and a pipe rack or holder common to a plurality of the pipes.

The object of the invention is to provide an improved form of joint or connection between the pipes and between the pipes and the rack which shall be characterized by increased tightness, flexibility, and durability, and facility for assembling and taking apart.

Of the accompanying drawings, Figure 1 represents a side elevation of a portion of an apparatus provided with my improved form of joint. Fig. 2 represents a longitudinal section thereof. Fig. 3 represents a section on the line 3 3 of Fig. 2.

The same reference characters indicate the same parts in all the figures.

In the drawings, 1 represents a flat plate constituting a pipe rack or holder common to a plurality of pipes, and 2 2 represent a series of pipes, two of which are shown in the drawings, having their ends supported by or mounted in said plate. The plate 1 is formed with screw-threaded holes 3 3, and the ends of the pipes are provided with annular flanges or projections 4 4, which are made of slightly less diameter than these holes in order that the ends of the pipes may be inserted and withdrawn through the holes. An abutment for the flanges 4 is provided by screwing into the holes 3 bushings 5 5, which closely embrace the pipes back of the flanges 4 and are each divided longitudinally into two halves in order to assemble them with or remove them from the pipes after the flanges have been formed on the latter.

6 is a return-bend or elbow connecting the two pipes 2 2 and forming a continuous conduit therewith. Its ends are formed with shoulders or flanges 7 7, between which and the flanges 4 on the ends of the pipes are inserted yielding packing-gaskets 8 8 and are further formed with annular extensions or sleeves 9 9, which project past the gaskets into the ends of the pipes 2 2 and serve to limit the inward extension of the gaskets under compression and also to hold the legs of the return-bend in axial alinement with the pipes. The bend 6 is drawn into engagement with the gaskets 8 by means of a bolt or screw 10, whose head abuts the under side of the plate 1 and whose stem passes through a hole in said plate and screws into a socket formed between the ends of the bend 6. This bolt also serves to removably hold the bend and the pipes in assembly with the rack 1. The resulting structure is fluid-tight and flexible, capable of withstanding rough usage without leaking, and easily assembled or taken apart.

I claim—

1. The combination of a pipe-connecting rack or holder formed with a plurality of holes, pipes projecting through said holes and connected by said holder and formed with flanges overlying one face of the holder, a return-bend connecting the pipes and having a telescopic connection therewith, and means connective of the holder and the return-bend and detachably holding the same and the pipes in assembly.

2. The combination of a pipe-connecting rack or holder formed with a plurality of apertures, longitudinally-divided bushings in said apertures, pipes projecting through the bushings and connected by said holder and formed with flanges overlying said bushings, a return-bend connecting the pipes, and means connective of the holder and the return-bend and detachably holding the same and the pipes in assembly.

In testimony whereof I have affixed my signature in presence of two witnesses.

HERBERT H. BUFFUM.

Witnesses:
G. BATCHELDER,
C. F. BROWN.